United States Patent [19]

Stall et al.

[11] Patent Number: 4,619,771
[45] Date of Patent: Oct. 28, 1986

[54] TECHNIQUE FOR INCREASED RETENTION TIME IN OIL FIELD SETTLING TANKS

[75] Inventors: Joe C. Stall; Steven L. Andrews, both of Tulsa; Donald D. Curnutt, Broken Arrow, all of Okla.

[73] Assignee: Standard Oil Company (Indiana), Chicago, Ill.

[21] Appl. No.: 681,168

[22] Filed: Dec. 13, 1984

Related U.S. Application Data

[63] Continuation of Ser. No. 399,639, Jul. 19, 1982, abandoned, which is a continuation of Ser. No. 200,840, Oct. 27, 1980, abandoned.

[51] Int. Cl.$^4$ .............................................. B01D 21/24
[52] U.S. Cl. ..................................... 210/788; 210/800; 210/512.1; 210/519
[58] Field of Search .................... 210/788, 800, 512.1, 210/519

[56] References Cited

U.S. PATENT DOCUMENTS 3,675,771  7/1972  McKee ................................ 210/800
4,035,302  7/1977  Seo et al. ............................ 210/304

Primary Examiner—Ivars Cintins
Attorney, Agent, or Firm—Timothy H. Briggs

[57] ABSTRACT

A technique for continuous gravity separation of a produced oil and water emulsion has particular utility in separating water for reinjection during a waterflood secondary recovery operation without loss of saleable oil. The method employs a flow direction means to introduce the produced oil-water emulsion into a large volume settling tank substantially tangential to the tank wall and then withdraws the separated oil and water. The apparatus of the instant invention comprises: (a) a tank, (b) an oil-water inlet means, (c) a flow direction means connected to the oil-water inlet means to direct the oil-water emulsion into the settling tank tangential to the tank wall, (d) a bottom-center located water outlet pipe, and (e) an oil outlet pipe.

12 Claims, 5 Drawing Figures

TECHNIQUE FOR INCREASED RETENTION TIME IN OIL FIELD SETTLING TANKS

This is a continuation of copending application Ser. No. 399,639 filed July 19, 1982 which is a continuation of application Ser. No. 200,840 filed on Oct. 27, 1980, both now abandoned.

In oil field production operations, the produced fluids are a mixture of oil and water. This is especially true for a producing field undergoing a waterflood secondary recovery operation. The produced fluid mixture must be separated into separate streams of oil and water so that the oil may be sold and the water subsequently disposed of by reinjection into the producing formation if the field is undergoing a waterflood or by other disposal methods. These separations, however, often prove troublesome as the produced oil-water mixture may be emulsions which are difficult and slow to break.

Methods of separation of these emulsions include heating and addition of chemical demulsifiers. A further method of breaking these emulsions is to utilize large volume settling tanks to achieve the required retention time for a continuous gravity separation of the oil and water. In these large volume tanks, however, fluid channeling from the fluid inlet to the water outlet often occurs. As a result, the separated water contains significant amounts of oil and may be unfit for subsequent disposal or valuable oil is reinjected into the formation in the water injection phase of the waterflood and is lost. Reinjection of oil into the formation has a further adverse affect in that it results in the plugging of the formation.

"Efficient Separators Show Good Hydraulic Behavior" by B. Zemel of Shell Development Company in the Oil and Gas Journal, Dec. 26, 1977, discusses the problems with gravity separations in large volume settling tanks. Therein it is stated that in a 15,000 barrel wash tank for the separation of a heavy California crude oil from produced water, the anticipated means retention time for the tank was 45 hours for the oil and 33 hours for the water. The author employed a radioactive tracer to monitor the actual time span for a fluid to enter this tank and then to exit. According to the article, the results showed that the injected tracer reached the tank exit immediately. This occurrence is described as an extreme short circuiting of the oil-water mixture from the inlet of the water outlet. The author states that the short circuiting is usually not this extreme but is a common falling of large volume tanks of this type.

A method of dealing with this channeling of fluids and subsequent poor separation employs the insertion of baffles into the tank to change the flow behavior. An example of these baffles is U.S. Pat. No. 4,132,652 entitled "Slotted Baffle for Use in Separating Oil-Water Mixtures" issued on Jan. 2, 1979, to D. K. Anderson and M. A. Steward. The above-mentioned Oil and Gas Journal article also describes a removable baffle for obtaining horizontal free-water knock-out. Another known method of dealing with this problem utilizes several different tanks in communication with each other for continuous gravity separation. An example of this type of separation technique is U.S. Pat. No. 3,862,040 entitled "Separator for Liquids of Different Densities" issued on Jan. 21, 1975 to P. Preus, et al.

These methods, however, employ the installation of extensive baffle systems or the use of several holding tanks in communication with each other to eliminate the problem of fluid channeling. For continuous oil field separation in large holding tanks, an effective and inexpensive technique for performing the separation while avoiding the channeling of fluids directly from the inlet to the exit, has been found in the apparatus and method of the instant invention.

SUMMARY OF THE INVENTION

The instant invention comprises a method and apparatus for continuous gravity separation in a large volume settling tank of a produced oil-water mixture which eliminates channeling of the introduced fluid mixture from the inlet to the water outlet by directing the introduced fluids into the tank so that the fluid entry is substantially tangential to the tank wall. The separated oil and water are then continuously withdrawn through respective outlet pipes simultaneously with the introduction to the tank of additional fluid. The tangential entry of the fluid mixture into the tank induces a slow vortex-like flow pattern in the tank. The induced flow pattern then interfers with and prevents the channeling of fluid directly from the inlet to the outlet before gravitational separation of the fluids can occur. The apparatus of the instant invention comprises a tank, an oil-water mixture inlet means, an oil outlet means, a bottom-center located water outlet means, and a flow direction means connected to the oil-water inlet means for directing the entry of the oil-water mixture tangential to the tank wall.

DETAILED DESCRIPTION OF THE PREFERRED EMBODIMENTS

Figure 1:
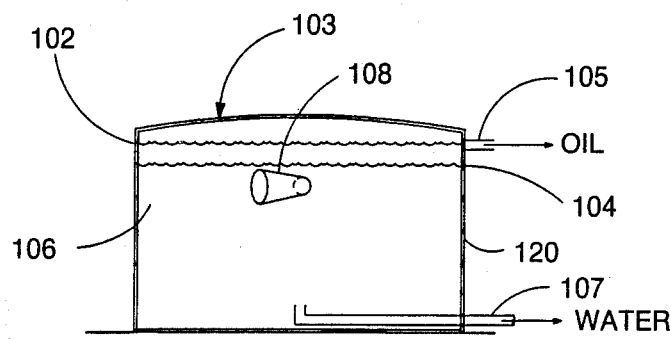
FIG. 1 shows a side view of the apparatus of the instant invention.

FIG. 1 is a side view of the apparatus of the instant invention. The apparatus employs a large volume settling tank 103, a flow direction means 108, an oil outlet means 105, and a water outlet means 107. (An oil-water inlet pipe 122 is connected to the flow direction means and is not shown in FIG. 1). The tank employed can be of a standard cone bottom design to facilitate settling of sediments contained in the fluids to be separated.

FIG. 1 also shows a tank fluid level 102 which indicates the oil level of the fluids in the tank. Level 104 is the oil-water interface of the separated fluids in the tank. Volume 106 is the water volume portion of the fluids in the tank.

In the method of the instant invention an oil-water emulsion mixture is continually introduced into the tank through the flow direction means 108 so that the mixture enters the tank substantially tangential to the tank wall 120. Then, simultaneously with the introduction of additional fluid into the tank through the flow direction means, separated oil is continuously withdrawn through oil outlet means 105 and water is continuously withdrawn through the bottom-center located water outlet means 107. In an alternate embodiment it is possible to introduce the fluid mixture into the tank substantially tangential to the tank wall through a plurality of flow direction means The tangential entry of the fluids creates a slow vortex-like flow pattern of fluid in the tank which interferes with adverse fluid channeling. The induced flow pattern establishes long circular-like flow paths in the tank which interfere with the direct channeling of the unseparated fluids from the mixture inlet to the water outlet. This in effect increases the reaction time of the fluid mixture in the settling tank. In addition, the desired gravity separation of oil and water in the settling tank requires a period of time. This required time period can be obtained by the induced slow vortex-like flow pattern thus allowing the desired gravitational separation. Thus, this tangential entry of fluids into the tank, by avoiding fluid channeling and permitting the gravity separation to take place prevents formation plugging and the loss of saleable oil by subsequent reinjection of oil contained in the separated water and eliminates the need for additional separation treatment.

The actual location of the flow direction means 108 can be at any height on the tank wall. It is preferable, however, that it is located so that it is approximately two-thirds to three-quarters of the distance between the top of the water outlet means 107 and the oil-water interface 104. This interface level 104 is dictated in practice by the volume input of fluid to be separated, but is readily predicted. The height above the tank bottom of the water outlet 107 is dictated by the amount of sediment in the produced fluids. This sediment amount depends on the producing field, but, in general the top of the water outlet should be above the sediment level expected. The water outlet should also be located in approximately the center of the tank to ensure that the input emulsion while flowing in an induced vortex pattern will not prematurely reach the water outlet. The location of the oil outlet 105 depends on the height of the oil volume desired in the tank, and is located at the desired distance above the oil-water interface 106. The oil outlet, however, is preferably located at least one foot below the top of the tank to prevent oil contamination of a well-known vapor recovery system which may be installed.

Figure 2:
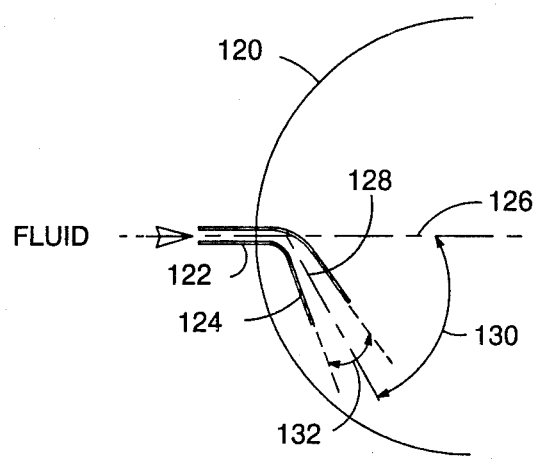
FIG. 2 shows, in more detail, a top view of the flow direction means of the apparatus of the instant invention.

FIG. 2 shows a detail top view of the flow direction means 108 of the apparatus of the instant invention. Through the use of this flow direction means, the oil-water emulsion mixture's entry into the settling tank is substantially tangential to the tank wall 120. Fluid is shown entering an oil-water inlet means 122. It then enters a diffuser means 124 for insuring the tangential to the tank wall entry of the fluids. The centerline 128 of the diffuser means, the centerline 126 of the oil water inlet means, the angle between the two center lines 130 and the angle between the two walls of diffuser means 124 are all indicated on FIG. 2. The angle 130 which the flow direction means 108 bends the flow of the introduced fluid is approximately 60 degrees to bring the flow tangential to the tank wall. The angle 132 between the inner walls of the diffuser means is approximately 15 degrees.

Figure 3:
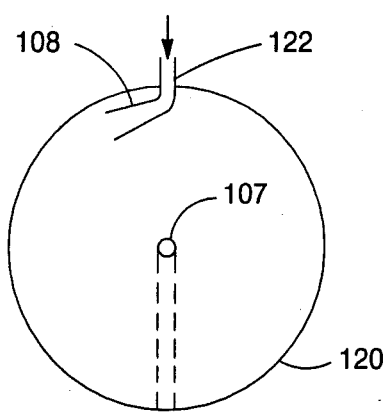
FIG. 3 is a sketch showing a top view below the oil outlet of the apparatus of the instant invention.

FIG. 3 shows a top view at a level below the oil outlet pipe 105 of the apparatus of the instant invention. The oil-water inlet 122 and the flow direction means 108 and indicated. The bottom-center located water outlet means 107 insures that water is withdrawn from the bottom center portion of the tank.

Figure 4:
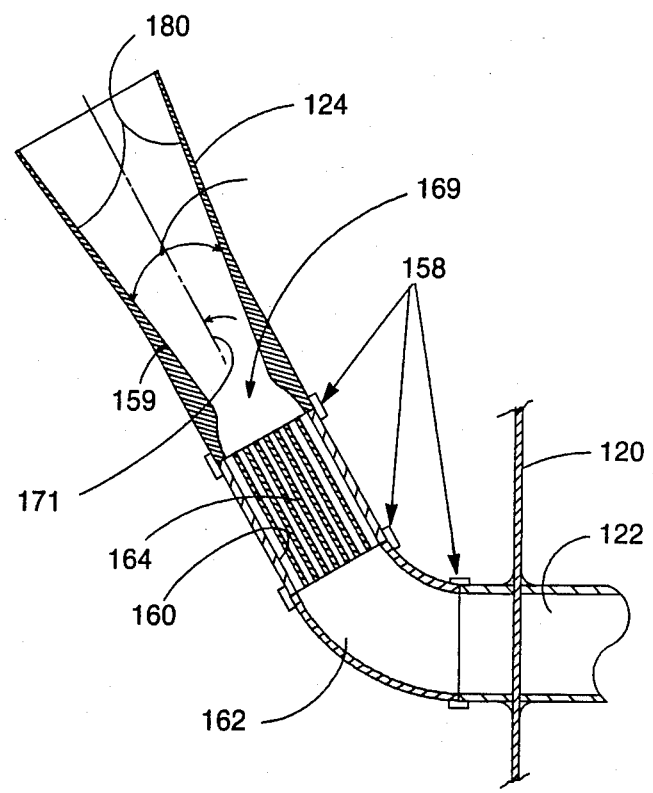
FIG. 4 shows a detailed drawing of the flow direction means of the apparatus of the instant invention.

FIG. 4 shows a detailed drawing of the flow direction means 108 of the apparatus of the instant invention. The oil-water inlet means 122 runs through the tank wall 120 and is connected to a flow bending means 162 by a Victaulic coupling clamp 158 (Victaulic is a trademark of Victaulic Company of America). The parts of the flow direction means can also be connected by other suitable well-known connective methods such as threaded connections. The flow bending means 162 is a curved section of pipe wich bends the flow of the input fluids approximately 60 degrees and is connected by another Victaulic clamp 158 to a flow straightening means 164. The flow straightening means is then connected by Victaulic clamp 158 to a diffuser means 124 for the actual entry of the fluids into the tank. The walls 180 of the diffuser means have an angle 157 between them of approximately 15 degrees. The flow diffuser means also contains a narrow throat 169. The narrow throat is to improve the dynamic flow characteristics of the oil-water mixture through the diffuser means. The angle 159 between a centerline 171 of the diffuser means and the inner wall 180 of the diffuser is approximately 7.5 degrees.

The flow straightening section 164 is to lessen the turbulence created by flow through the flow bending means 162. It prevents the fluids' tendency to rotate in a circular manner as is customary after liquids are flowed through any type of curved pipe. This lessens the mixing effect caused by the forced flow through the curved pipe. The flow straightening section can be one of several well-known designs to eliminate the rotational flow tendency, and a preferred version utilizes lengths of smaller diameter pipe placed inside the larger pipe 160 of the flow straightening means. The length of the flow straightening section may be of any desired length, but it is preferred to make the length double that of the diameter of the input pipe 122. The diameter of the flow straightening means is preferably the same as that of the input pipe 122.

The use of flow direction means as described also results in an overall reduction in the input fluid's velocity. The actual reduction achieved is the ratio of the area of the diffuser means 124 outlet to the area of the oil-water input means 122 exit. It is preferable that this reduction be 3:1, but other reductions will still permit the functioning of the instant invention. The purpose behind the velocity reduction is to lessen the mixing effects of the fluid entry into the tank but it is not believed necessary for the functioning of the method of the instant invention that any velocity reduction occurs.

The materials used in the apparatus of the instant invention are well-known in the oil field fluid handling industry. It is important that the material be able to withstand a corrosive environment as the input fluids will contain brine and often $H_2S$. Suitable materials for use are stainless steels, plastics, and fiberglass. To decrease the cost of the apparatus of the instant invention, the diffuser means 124 is preferrably constructed of fiberglass with its inner wall 180 coated with Gel-Kote (a Trademark of the Glidden-Durkee Div. of SCM Corp.), a polyester resin coating, or other similar coatings such as an epoxy coating to give a smooth surface.

The apparatus and method of the instant invention have been tested in several Amoco Production Company oil field settling tanks. The apparatus has been installed in settling tanks of varying sizes from 1000 barrels up to 10,000 barrels. The size of the inlet pipe 122 has varied from 4 inches (10.16 centimeters) up to 14 inches (35.56 centimeters). The actual size of the tank 110, inlet pipe 122, the flow direction means 108, the water outlet pipe 107, and the oil outlet pipe 105 will depend on the quantity of production fluids that must be handled.

Tests of the apparatus and method of the instant invention were performed in a 6,000 barrel standard A.P.I. cone bottom tank with total throughput of 10,500 barrels of fluid per day and an input line diameter 122 of 10 inches (25.4 centimeters). The tank has a diameter of 38 feet and 8 inches (11.78 meters), and a height of 30 feet (9.14 meters) above ground level. The oil-water inlet 122 is located 20 feet (6.1 meters) above the ground level and the water outlet 107 extends 4 feet (1.22 meters) above ground level. The oil outlet 105 is 2 feet (0.61 meters) down from the top of the tank and has a diameter of 10 inches (25.4 centimeters). The flow straightening section 164 was built by CEI Plastics of Odessa, TX and is 20 inches (0.51 meters) long. The diffuser means 124 was built as depicted in FIG. 4 and is made from fiberglass. It is coated on the inside with Gel-Kote to give a smooth surface. The overall length of the diffuser is 45.5 inches (1.16 meters). The throat 169 width is 7.18 inches (18.2 centimeters) and the inside diameter of the input section of the diffuser is 10.15 inches (25.78 centimeters) The inside diameter of the end of the diffuser is 17.58 inches (0.45 meters) resulting in an overall velocity reduction of approximately 3:1. The angles 157 and 159 are approximately 15 and 7.5 degrees, respectively. The flow bending means 162 is a standard 10 inch (25.4 centimeters) pipe with a 60 degree bend in it.

Figure 5:
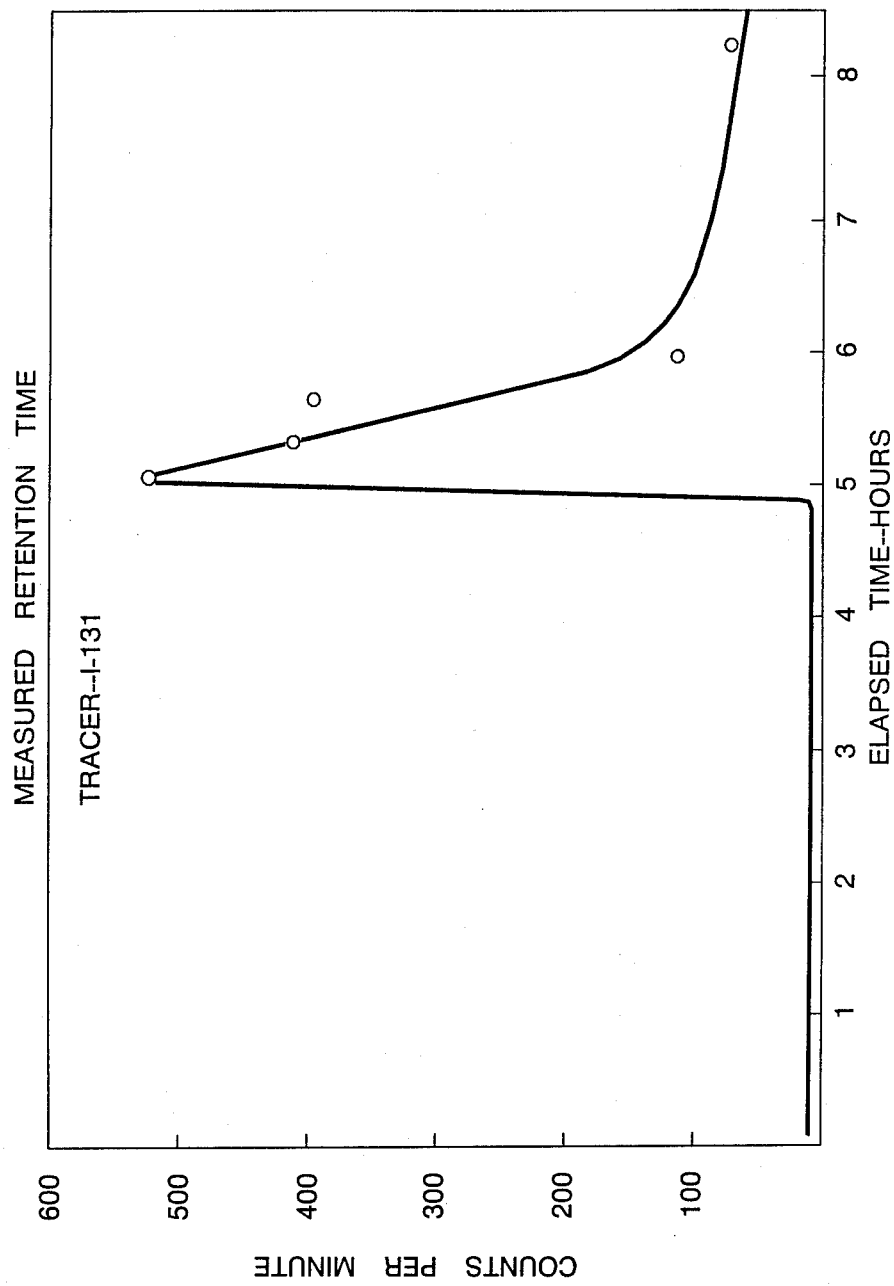
FIG. 5 shows a plot of the breakthrough time of a radioactive tracer introduced with an oil-water mixture into a settling tank with the technique of the instant invention.

The apparatus was tested by using a radioactive tracer of Iodine-131 and then monitoring the separated water for Iodine-131 concentration. It was found that the actual retention time of this holding tank equipped with the apparatus and employing the method of the instant invention was 4 hours and 52 minutes. The test results are plotted in FIG. 5. The shape of the breakthrough curve (FIG. 5) also shows that the tracer breakthrough was quite steep. This indicates that channeling of the tracer directly from the inlet to the outlet was eliminated, as there was no increase in the tracer concentration at the outlet until 4 hours and 52 minutes after injecting the tracer. No input fluid velocity measurements were made during the tests.

The method and apparatus of the instant invention were also tested in laboratory scale bench tests. The tests performed were to determine the input fluid velocity required to allow the tangential entry method and apparatus to work. In all tests the model tank was allowed to operate for a minimum seven hours to stabilize the flow patterns before velocity measurements were taken. The apparatus tested was as depicted in FIG. 4 with a fluid velocity reduction ratio of 3:1. The input fluids contained a water soluble dye to annouce the arrival of input fluids at the tank exit. The model tank had a radius of 15 inches (38.1 centimeters) and a height of 24 inches (0.61 meters). Velocity measurements were taken 12 inches (30.48 centimeters) from the center of the tank.

These tests revealed that any fluid velocity as measured at the end of the oil-water inlet pipe 122 above 3.3 in/sec (8.38 cm/sec) resulted in satisfactory functioning i.e., elimination of fluid channeling, of the method and apparatus. This indicates that for an apparatus employing the tangential fluid entry technique it is preferable that the fluid input be above this velocity. However, these model velocities have not been confirmed in field side apparatus tests. It is thus possible that in a full size installation, a lower velocity rate will allow the method to function satisfactorily.

It should be noted that the scope of the apparatus and method disclosed herein should be determined by the specification but rather its scope is determined by the extent of the appended claims.

We claim:

1. An apparatus for continuous gravity separation of an oil-water mixture comprising:
   a settling tank having a closed bottom;
   at least one oil-water inlet means disposed partially within said settling tank and in communication with the interior of said settling tank comprising an oil-water inlet pipe entering said settling tank substantially perpendicular to the wall of said settling tank at the point of entry of said pipe into said settling tank, a flow bending means connected to said oil-water inlet pipe for directing flow of oil-water mixture substantially tangential to the wall of said settling tank, and a diffuser means connected to said flow bending means for reducing the velocity and turbulence of flow of said oil-water mixture prior to discharge into said settling tank;
   a water outlet in communication with a lower portion of the interior of said settling tank; and
   an oil outlet in communication with an upper portion of the interior of said settling tank.

2. The apparatus for continuous gravity separation of an oil-water mixture, as recited in claim 1, wherein said flow bending means comprises a curved section of pipe.

3. The apparatus for continuous gravity separation of an oil-water mixture, as recited in claim 1, wherein said diffuser means comprises a conduit section having an outlet with cross-sectional area larger than that of the inlet to said conduit section.

4. The apparatus for continuous gravity separation of an oil-water mixture, as recited in claim 3, wherein said diffuser means further comprises a narrow throat within said conduit section with a cross-sectional area less than that of said inlet to said conduit section.

5. The apparatus for continuous gravity separation of an oil-water mixture, as recited in claim 1, wherein said oil-water inlet means additionally comprises a flow straightening means connected between said flow bending means and said diffuser means for preventing said oil-water mixture's tendency to rotate after flowing through said flow bending means.

6. The apparatus for continuous gravity separation of an oil-water mixture, as recited in claim 5, wherein said flow straightening means comprises:
   a section of conduit; and
   at least one flow straighening vane disposed within said section of conduit.

7. The apparatus for continuous gravity separation of an oil-water mixture, as recited in claim 6, wherein said straightening vane comprises a smaller diameter pipe disposed within said section of conduit.

8. The apparatus for continuous gravity separation of an oil-water mixture, as recited in claim 6, wherein the length of said section of conduit is twice the diameter of said section of conduit.

9. A process for continuous gravity separation of an oil-water mixture comprising the steps of:

discharging said oil-water mixture into a settling tank in a direction and at a velocity sufficient to direct the flow of the contents of said settling tank substantially tangential to the walls of said settling tank by introducing said oil-water mixture into said settling tank through an oil-water inlet pipe entering said settling tank substantially perpendicular to the wall of said settling tank at the point of entry of said pipe into said settling tank, bending the flow direction of said oil-water mixture to be introduced into said settling tank substantially tangential to said settling tank walls and reducing the velocity of said flow of said oil-water mixture after said bending by passing said oil-water mixture through a diffuser means;

withdrawing water from a lower portion of the interior of said settling tank; and withdrawing oil from an upper portion of the interior of said settling tank.

10. A process for continuous gravity separation of an oil-water mixture, as recited in claim 9, wherein said discharging said oil-water mixture additionally comprises straightening said flow of said oil-water mixture to prevent said oil-water mixture's tendency to rotate after said bending the flow direction of said oil-water mixture and before said reducing the velocity of said flow of said oil-water mixture.

11. An apparatus for continuous gravity separation of an oil-water mixture, comprising:
(a) a settling tank having a closed bottom;
(b) oil-water inlet means connected to the settling tank and in communication with the interior thereof;
(c) water outlet means in communication with a lower portion of the interior of the settling tank;
(d) oil outlet means in communication with an upper portion of the interior of the settling tank; and
(e) flow direction means connected to the oil-water inlet means and disposed partially within the settling tank for directing the flow of the oil-water mixture substantially tangential to the settling tank wall, the flow direction means comprises a tubular housing having at least one flow baffle disposed therein and a venturi chamber disposed therein.

12. An apparatus for continuous gravity separation of an oil-water mixture, comprising:
(a) a settling tank having a closed bottom;
(b) oil-water inlet means connected to the settling tank and in communication with the interior thereof;
(c) water outlet means in communication with a lower portion of the interior of the settling tank;
(d) oil outlet means in communication with an upper portion of the interior of the settling tank; and
(e) flow direction means connected to the oil-water inlet means and disposed partially within the settling tank for directing the flow of the oil-water mixture substantially tangential to the settling tank wall, the flow direction means comprises a tubular housing having at least one flow baffle disposed therein and wherein the flow direction means bends the oil-water mixture flow at approximately a 60° angle.

* * * * *